United States Patent
Albrecht et al.

(10) Patent No.: US 6,344,949 B1
(45) Date of Patent: Feb. 5, 2002

(54) FLYING HEIGHT ADJUSTMENT FOR AIR BEARING SLIDERS

(75) Inventors: Thomas Robert Albrecht; Robert Edward Fontana, Jr.; Prakash Kasiraj, all of San Jose; Erno Hilbrand Klaassen, Santa Clara; Robert Nolan Payne, San Jose; Timothy Clark Reiley, Los Gatos, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/352,538

(22) Filed: Jul. 13, 1999

(51) Int. Cl.[7] ............................ G11B 17/32; G11B 21/21
(52) U.S. Cl. ............................ 360/236.5; 360/294.7
(58) Field of Search ........................... 360/294.7, 230, 360/234.1, 234.3, 235.4, 235.5, 235.7, 236.5, 290, 294, 244.2, 244.9, 103

(56) References Cited

U.S. PATENT DOCUMENTS 5,276,573 A * 1/1994 Harada ..................... 360/103

FOREIGN PATENT DOCUMENTS

| JP | 6321272 | 1/1988 | |
| JP | 63228461 A | * 9/1988 | ........... G11B/17/34 |

* cited by examiner

*Primary Examiner*—A. J. Heinz
*Assistant Examiner*—Noel Monardes
(74) *Attorney, Agent, or Firm*—Lumen Intellectual Property Services, Inc.

(57) ABSTRACT

Flying height Adjustment for Air Bearing Sliders An air bearing slider for sliding over a medium surface of a recording medium and having an air bearing surface facing the disk surface, a back surface perpendicular to the air bearing surface and a head at the back surface. During operation the head is maintained at a flying height above the disk surface with the aid of a flying height adjustment mechanism consisting of one or more ducts, each having an inlet at the air bearing surface and an outlet at the back surface. A valve mechanism controls an air flow through the duct or ducts by opening and closing the valve or valves together or independently. Alternatively, a deformable surface feature located on the back surface of the slider is used to alter the air flow to thus control the flying height. The mechanism of the invention allows one to achieve accurate flying height control in a range between 5 and 50 nm and between 0 nm and 15 nm as required for near-field or contact disk drives. By adjusting the flying height the contact can be limited to times of reading or writing data to the disk, thereby lowering the total contact time thereby reducing head/disk interface wear.

34 Claims, 12 Drawing Sheets

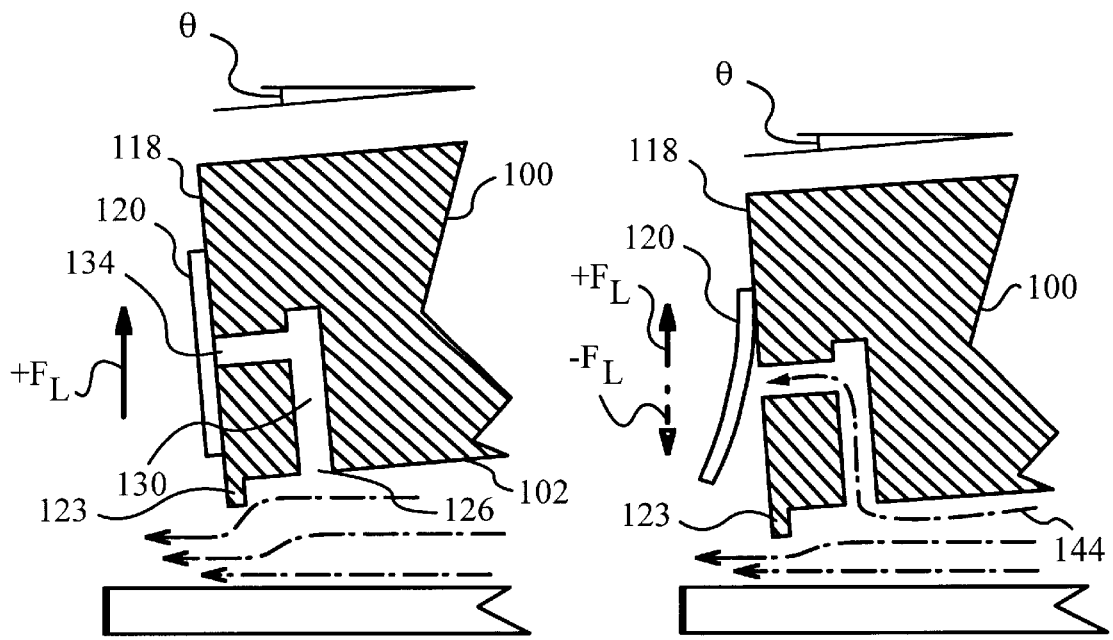
FIG. 5A   FIG. 5B
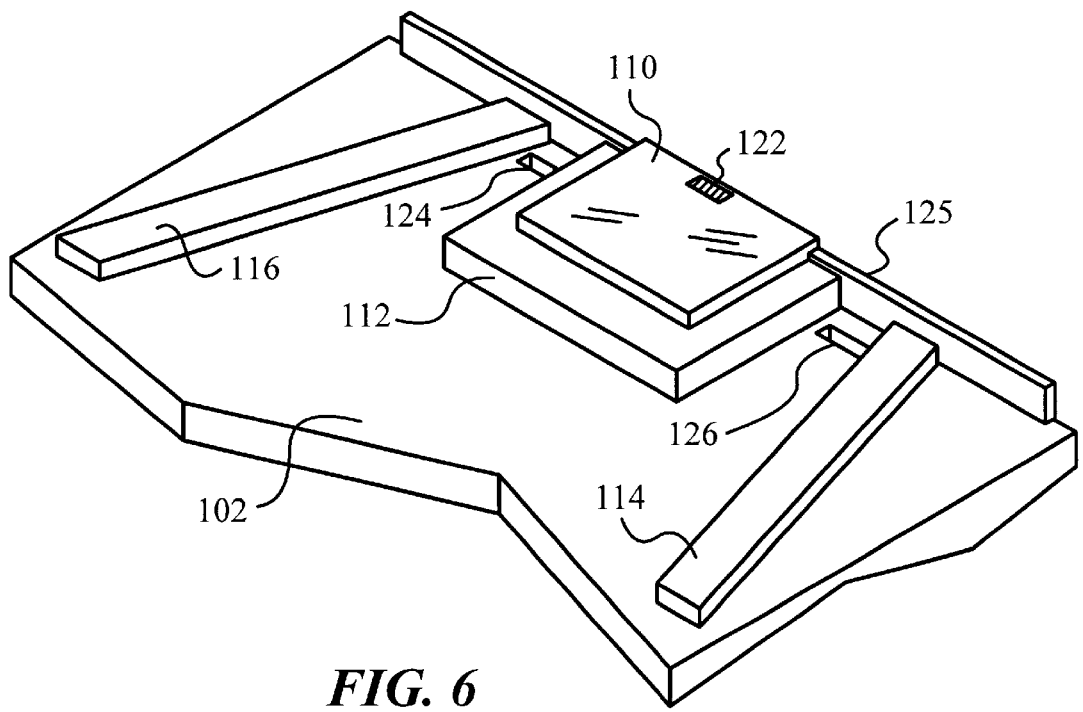
FIG. 6

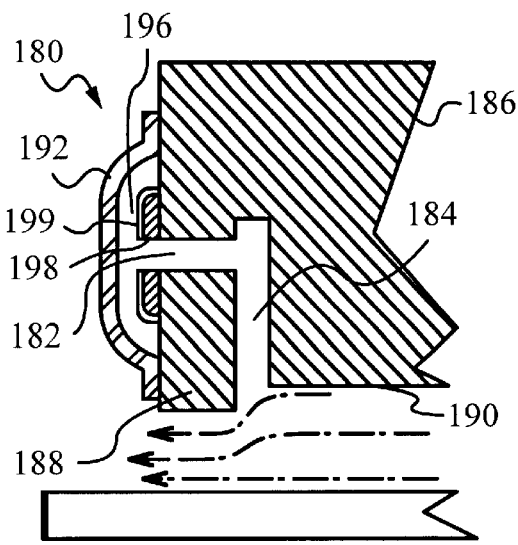
*FIG. 10A*
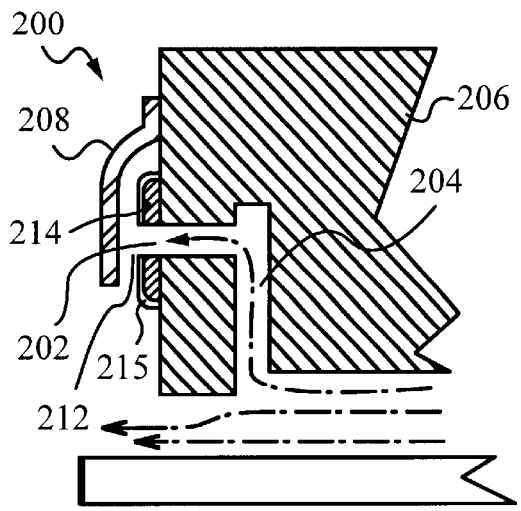
*FIG. 10B*
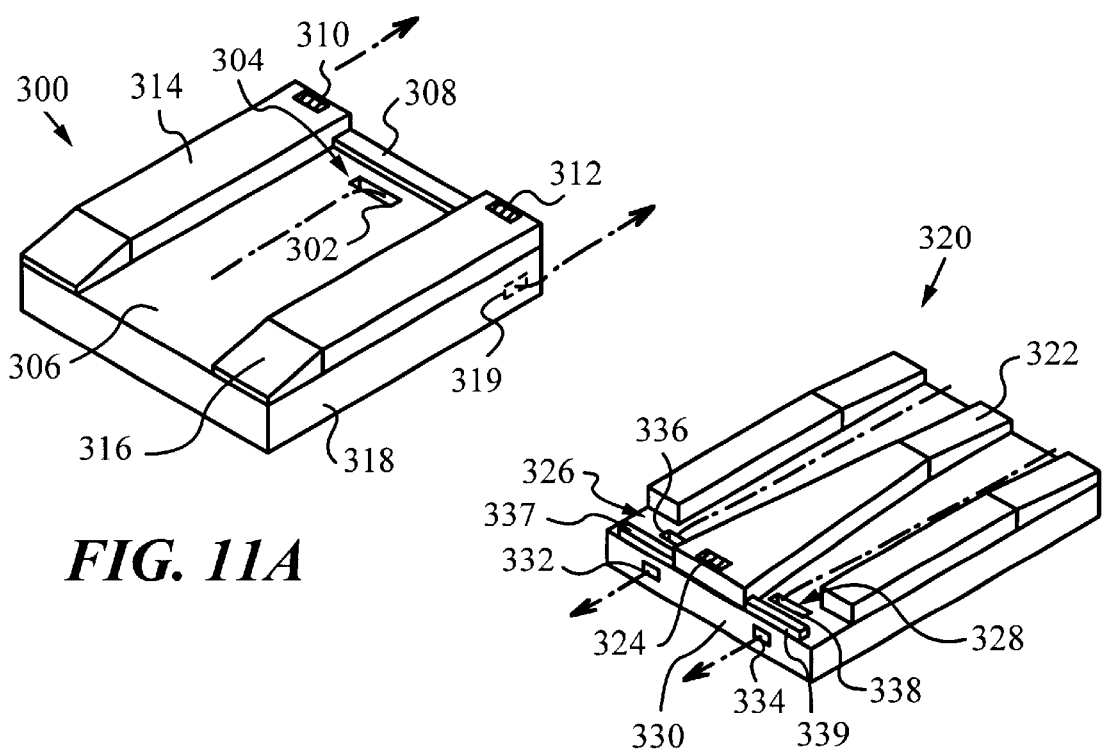
*FIG. 11A*
*FIG. 11B*

SIDE VIEW　　TOP VIEW

FLYING HEIGHT ADJUSTMENT FOR AIR BEARING SLIDERS

FIELD OF THE INVENTION

This invention relates generally to air bearing sliders with flying height adjustment, and in particular to air bearing sliders using ducts and/or surface features for altering the air flow to adjust the flying height.

BACKGROUND OF THE INVENTION

Air bearing sliders utilize a boundary layer of air compressed between the slider's air bearing surface and a moving surface to "fly" over the moving surface. The air bearing surface is shaped such that part of the boundary layer of air carried by the moving surface is compressed and forced to flow underneath the slider. This compressed air flow supports the slider at a flying height above the moving surface by creating a lift force. More complicated air bearing surfaces may have air bearing surfaces with areas which reduce the air pressure at some locations under the slider to produce a force pulling the slider down to the moving surface.

Air bearing sliders are commonly used in the field of magnetic recording for carrying magnetic recording heads at a specific flying height above a magnetic recording medium, typically a disk. It is at the interface between the head and the medium where the critical processes of magnetic recording occur. Maintaining a stable and reliable interface is required to ensure proper functioning of a disk drive. For example, if the spacing between a write head and the magnetic disk is too large, the head's fringing field will be too weak to record data on the disk. Also, the read-back signal registered by a read head (usually, a magnetoresistive head integrated with the write head) will be reduced and data errors may occur. On the other hand, very low head-disk spacing may improve magnetic performance, but can lead to mechanical wear of the head and disk, substantially reducing the lifetime of both.

Under some circumstances it is desirable to change the flying height of the slider holding the magnetic recording head in a disk drive. One primary reason is that the areal density of data can be increased when the recording head is close to the disk surface. That is because magnetic recording is a "near-field" process; in other words, writing by the write head and reading by the read head occur in close proximity to the head's gap. This leads to an exponential dependence of the field on the spacing between the head and disk and, consequently, areal density.

Of course, as areal density of data increases, the tolerances in the head-disk spacing or the flying height must be reduced. This places significant constraints on both head and disk parameters. Since typical disks can be out of flatness by as much as 20–50 $\mu$m and the glider flies at a height of less than 50 nm the compliance of the head and suspension must be sufficient to compensate for this large motion while tracking the disk surface.

The prior art air bearing technology used in disk drives offers a large number of different designs. They were developed to satisfy somewhat different criteria, and over the years they have become more elegant, with improved performance allowing decreased head-disk spacing. Some of the requirements for specific air bearing designs include rapid take-off, close compliance to the disk's surface, stable flying and minimal variation of flying height of the slider at different radial positions on the disk. The last item is important since the relative velocity of the head over the disk can change by as much as a factor of 2 from the inside to the outside diameter of a typical magnetic recording disk. The different velocities alter the air pressure under the slider and result in changes in flying heights than can impact the head's ability to read and write properly. Changes in ambient pressure also affect the flying height. Thus, the flying height in a disk drive operating in a low pressure environment, e.g., on-board an airplane, is different than the flying height in a disk drive operating at standard atmospheric pressure. Finally, with the widespread use of rotary actuators in disk drives, the air bearing must be able to fly in a stable manner over a range of azimuthal orientations (20–25 degrees) of the head with respect to the disk.

Most recent technological advances are pushing disk drives to the limiting case in which the head and disk are in contact during recording. A problem associated with contact recording is that the disk and head are subject to wear. Even though wear rates are minimized through coatings and lubrication, this wear can lead to sufficient damage or degradation through corrosion such that the recording process is no longer functional. It would be desirable to limit the contact to the times when recording is taking place while maintaining a low flying height, e.g., on the order of 5–50 nm at all other times.

The prior art contains a number of proposals for reducing and stabilizing the flying height of the various slider designs. Some solutions involve using piezoelectric actuators for exerting a controllable downward force at the supported end of the load arm on which the slider is mounted.

JP-A-63-228461 describes a slider having a negative pressure generating recess. Control is achieved using a vent hole bored through from the negative pressure pocket to the top surface of the slider, and a piezoelectric flap lying over the top surface of the vent hole. Piezoelectric control of the flap acts like a valve on the vent hole and regulates the negative pressure and hence the flying height. U.S. Pat. No. 5,276,573 to Harada et al. also teaches the use of a vent passing from the air bearing surface of the slider to the top surface. A piezoelectrically or electrostatically controlled valve layer is positioned over the vent at the air bearing surface of the slider to control the air flow through the vent hole and thus control the flying height of the slider. The slider body is made of a ceramic base portion and includes a semiconductive insert portion of silicon or photosensitive glass.

Unfortunately, sliders using vent holes between the air bearing surface and the top surface as taught in JP-A-63-228461 and U.S. Pat. No. 5,276,573 do not solve the problem of flying height adjustment. In particular, mounting a valve on the air bearing surface is very difficult to do. Providing a vent hole in the ceramic body of the slider poses serious manufacturing problems because of the hardness of the ceramic material. Furthermore, with the progressive miniaturization of sliders the mounting of valves on the air bearing surface becomes impracticable. In fact, state of the art patterning techniques used in head manufacture are fundamentally incompatible with the solutions taught in JP-A-63-228461 and U.S. Pat. No. 5,276,573. In addition, valve structures (especially thin ones) at the air bearing surface are more subject to contamination which prevents valve motion.

In view of the above, the present air bearing technology does not offer suitable designs for achieving accurate flying height control. Specifically, the prior art does not teach how to achieve low flying heights and maintain or adjust them to enable near-contact or contact recording. Prior art sliders are also not capable of adjustments for operating parameters and environmental factors affecting the flying height. These include flying velocity as well as variations in pressure and temperature. Finally, the prior art solutions are incompatible with modern head manufacturing techniques.

OBJECTS AND ADVANTAGES OF THE INVENTION

Accordingly, it is a primary object of the present invention to provide an air bearing slider designed to allow one to efficiently adjust the flying height. The slider should be capable of maintaining flying heights of a read/write head in the range of 5–50 nm to a high degree of accuracy. In addition, the control mechanism should allow the slider to effectuate flying height adjustments in response to changes in operating parameters as well as fluctuations of environmental factors. Specifically, the air bearing slider with the flying height control in accordance with the invention should permit one to implement it in near-contact or contact disk drives. During contact or near-contact reading and recording the flying height control should permit one to maintain flying heights of the read/write head in the range from 0 nm to 15 nm.

It is another object of the invention to provide a method of flying height control which can be adapted to various designs of air bearing sliders with different types of air bearing surfaces.

Furthermore, it is an object of the invention to ensure that the flying height control mechanism is compatible with modern patterning techniques used in head manufacture. In fact, it is an object of the invention to teach a method of manufacturing the head together with the flying height control mechanism to provide an integrated manufacturing solution.

The above objects and advantages, as well as numerous improvements attained by the system and method of the invention are pointed out below.

SUMMARY

These objects and advantages are attained by an air bearing slider designed for moving relative to or "sliding over" a medium surface of a recording medium such as a magnetic recording disk. The slider has an air bearing surface facing the disk surface, and a back surface which is nearly or exactly perpendicular to the air bearing surface. The slider carries a head, e.g., a read/write head, at the back surface. During operation the head is maintained at a flying height above the disk surface with the aid of a flying height adjustment mechanism.

The flying height adjustment mechanism consists of one or more ducts, each having an inlet at the air bearing surface and an outlet at the back surface. A valve mechanism, which can include one or more valves selected from among diaphragm valves, flap valves or cantilever valves is mounted over the outlet for controlling an air flow through the duct which develops when the slider is flying. The flying height is adjusted by opening and closing the valve or valves. A mechanism for opening and closing the valve(s) together or independently is also provided.

In one embodiment the slider has two ducts and only one valve mounted over the outlets of both ducts. In this case, the valve is preferably a flap valve. In fact, the valve can be of any suitable type selected from among electrostatic valves, piezoelectric valves, electrothermomechanical valves, electromagnetic valves and hydraulic valves.

Air bearing sliders with the flying height adjustment mechanism according to the invention can have additional surface features on the air bearing surface. These can be topographical features and include so-called positive and negative air bearing elements, which locally cause pressures on the slider which are higher or lower than the ambient pressure respectively. Preferably, at least one surface feature is provided on the air bearing surface for altering the air flow through the duct or ducts. In one embodiment the surface feature is a fence positioned downstream from the inlet. In another embodiment the surface feature includes side rails which funnel the air flow to the inlet.

The flying height adjustment mechanism can be applied to any suitable slider design. For example, dual-rail sliders, tri-rail sliders, transverse pressure contour sliders and integrated sliders can be provided with ducts and valves in accordance with the invention. The mechanism of the invention allows one to achieve accurate flying height control in a range between 5 and 50 nm and between 0 nm and 15 nm as required for near-field or contact recording or reading.

In an alternative embodiment the air bearing slider has a flying height adjustment apparatus which includes a deformable surface feature positioned on the back surface. At least a portion of the deformable surface feature extends into the air flow exiting at the back surface from under the air bearing surface. A control mechanism is provided for adjusting the deformable surface feature to thus control the air flow and adjust the flying height. Preferably, the deformable feature is a flap valve with an edge extending into the air flow.

As in the above embodiments, an air bearing slider equipped with the deformable feature on its back surface can additionally possess surface features for altering the air flow along the air bearing surface. For example, side rails for funneling the air flow can be provided. Also, the slider can be of any type selected from among dual-rail sliders, tri-rail sliders, transverse pressure contour sliders, pad sliders, integrated sliders or any other suitable kinds of sliders.

The method of the invention is implemented by providing at least one duct in the air bearing slider, mounting a valve or a number of valves over the outlet of the duct and controlling the air flow by opening and closing the valve or valves. The fabrication or processing steps involved in making the duct are preferably coordinated with the steps for making the head. In other words, the ducts and the head are preferably made concurrently using the same or similar processing steps.

The method of the invention further includes operating the valve to adjust for flying parameters and/or environmental factors such as pressure or temperature. To achieve this a particular sequence of opening and closing of one or more of the valves may be required.

The particulars of the invention and its various embodiments are described in detail in the detailed description section with reference to the attached drawing figures.

DESCRIPTION OF THE FIGS

FIG. 5A is a cross sectional view of the back portion of the slider of FIG. 4 along line B-B with the flap valve closed.

FIG. 5B is a cross sectional view of the back portion of the slider of FIG. 4 along line B-B with the flap valve open.

FIG. 6 is an isometric view of the back portion of the air bearing slider of FIG. 4 with a single fence.

FIGS. 10A–B are cross sectional side views illustrating alternative valves.

FIGS. 11A–D are isometric views showing various types of air bearing sliders implementing the flying height adjustment mechanism of the invention.

Figure 12A:
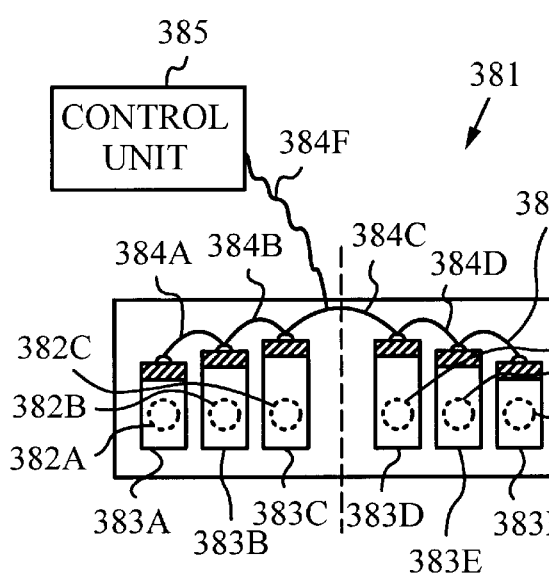
Figure 12B:
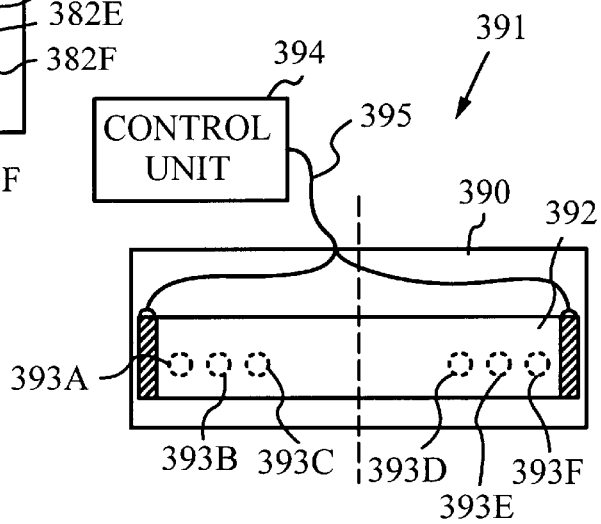
Figure 13A:
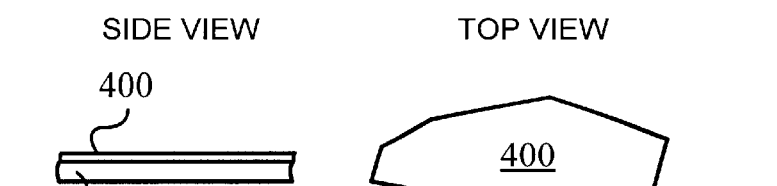
Figure 13B:
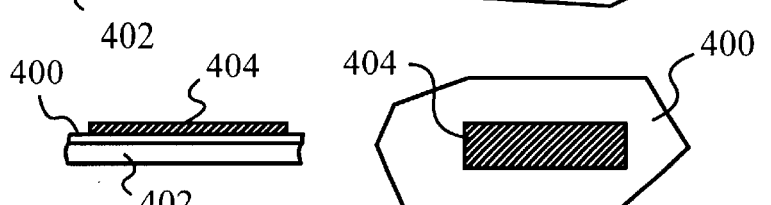
Figure 13C:
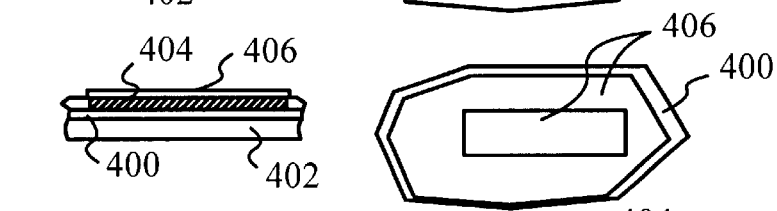
Figure 13D:
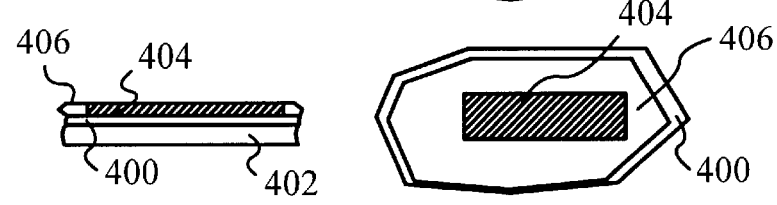
Figure 13E:
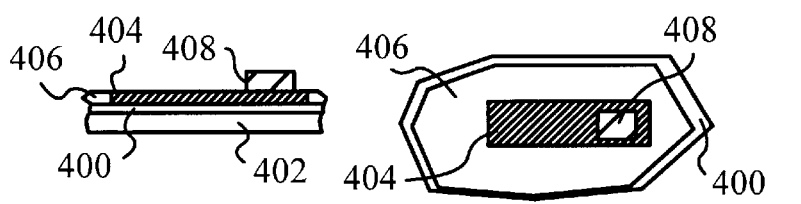
Figure 13F:
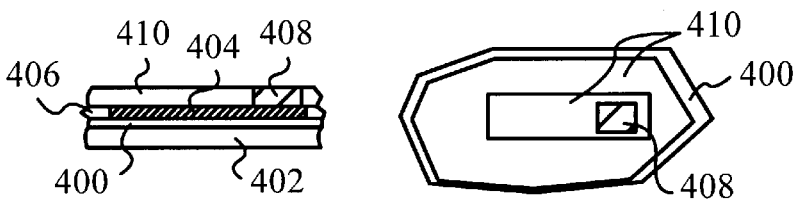
Figure 13G:
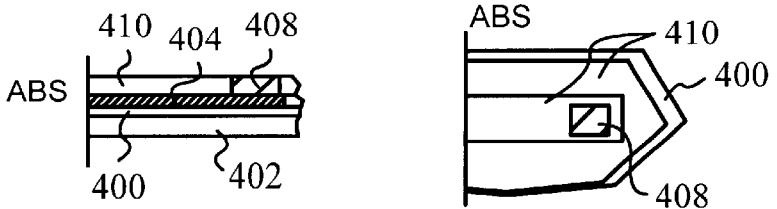
Figure 13H:
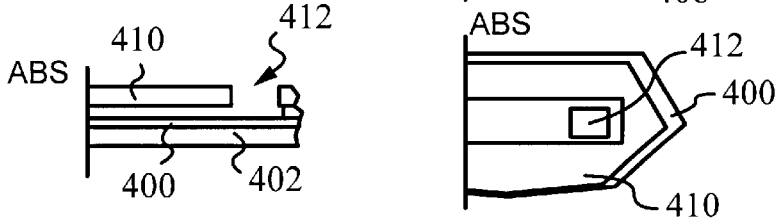
Figure 14A:
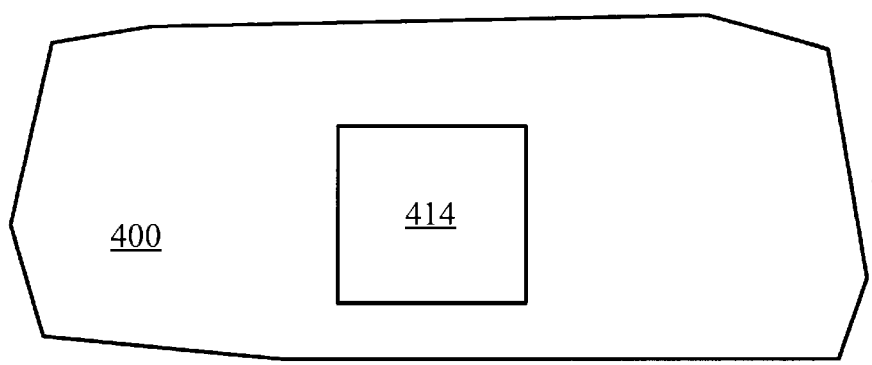
Figure 14B:
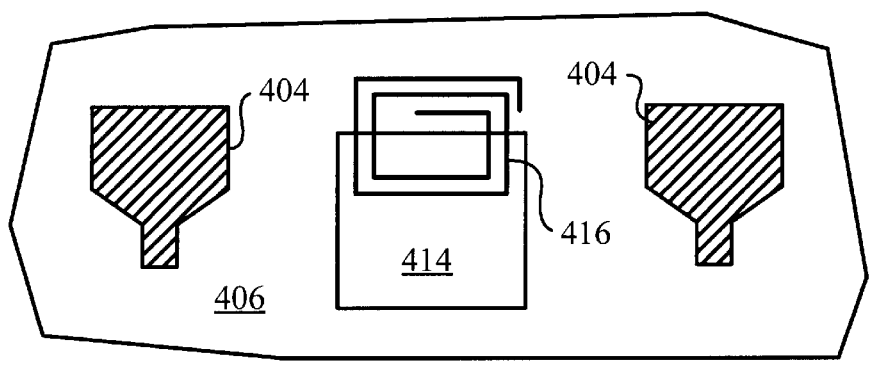
Figure 14C:
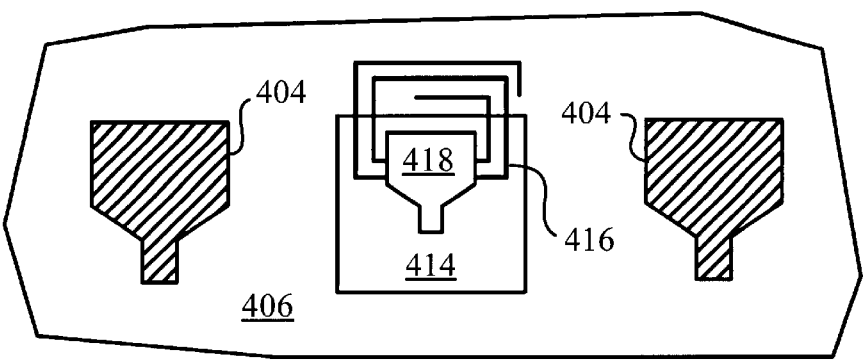
Figure 14D:
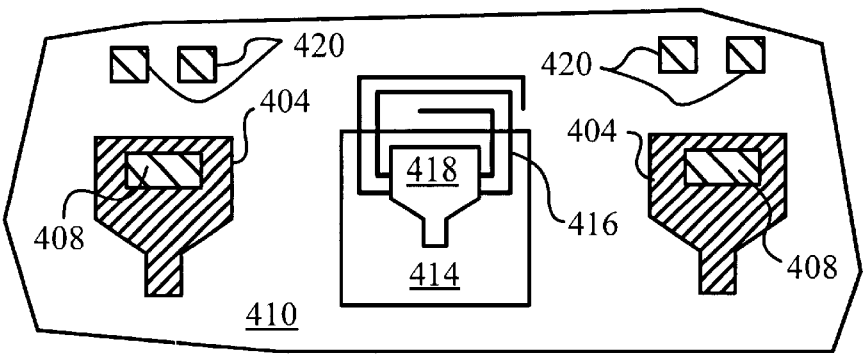
Figure 15A:
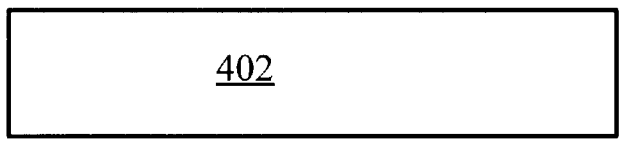
Figure 15B:
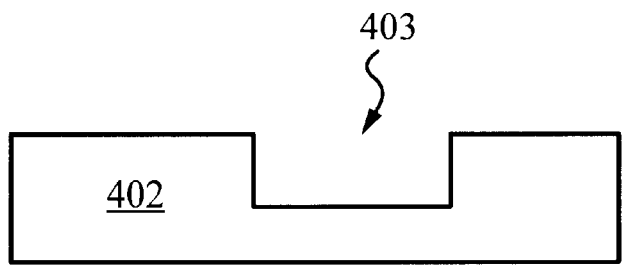
Figure 15C:
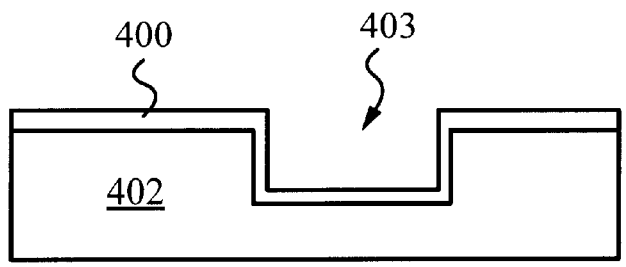
Figure 15D:
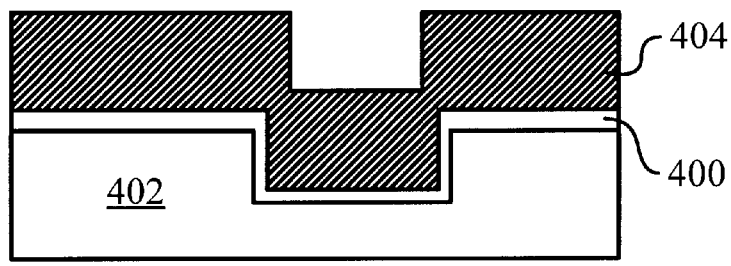
Figure 15E:
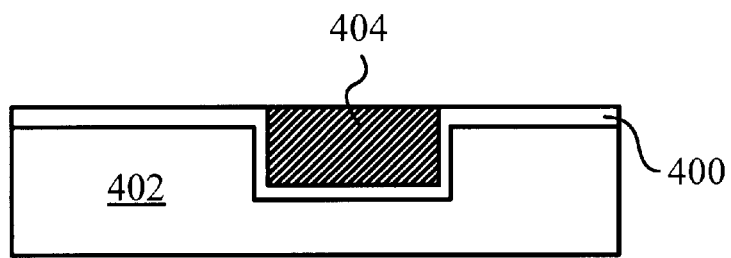

FIGS. 12A–B are plan schematic views of back surfaces of air bearing sliders with different valve configurations.

FIGS. 13A–H is a series of diagrams illustrating the manufacturing processes of a duct in a slider.

FIGS. 14A–D is a series of diagrams illustrating a preferred manufacturing process during which a head and two ducts are fabricated concurrently.

FIGS. 15A–E is a series of diagrams illustrating an alternative method of making a duct in accordance with the invention.

Figure 16A:
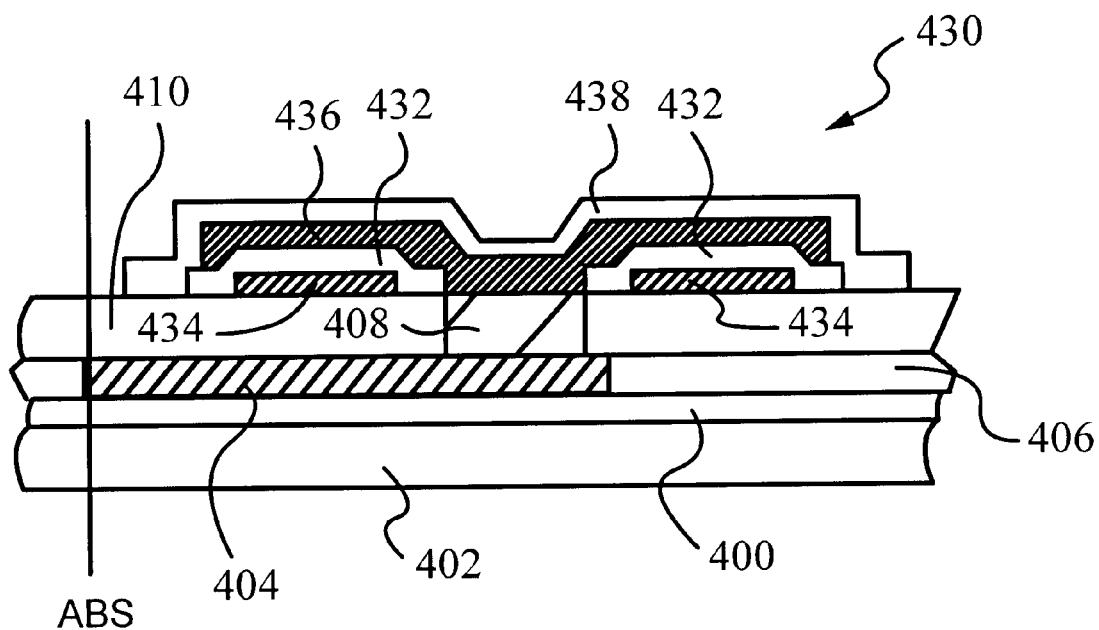
Figure 16B:
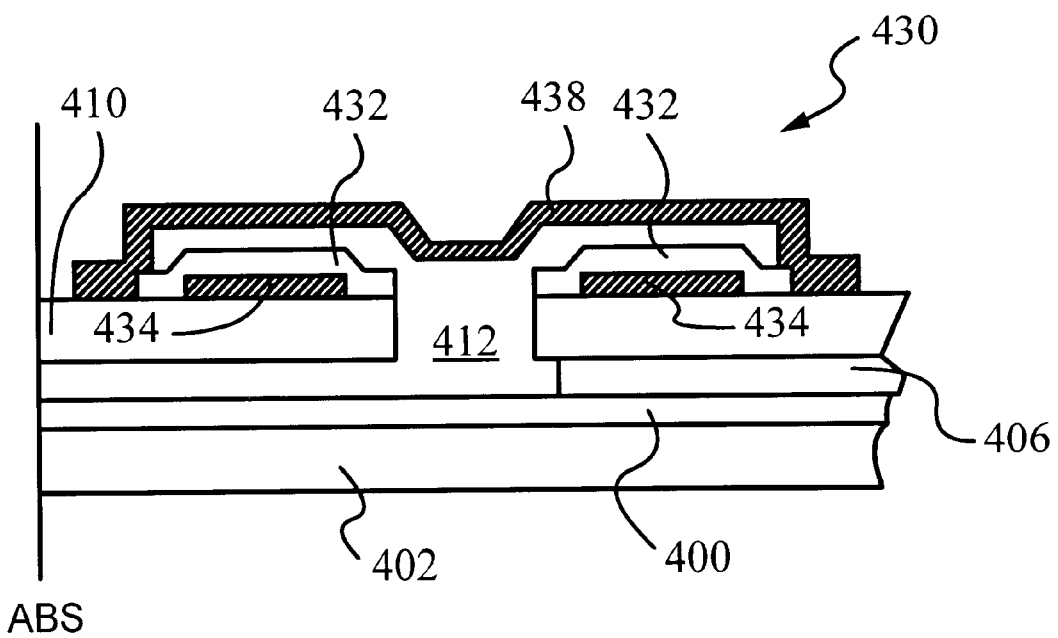

FIGS. 16A–B are diagrams showing the fabrication of a diaphragm valve over a duct outlet in accordance with the invention.

DETAILED DESCRIPTION

For the purposes of this description the term flying height is understood to refer to the flying height of a read/write head above a recording medium, unless otherwise indicated.

Figure 1:
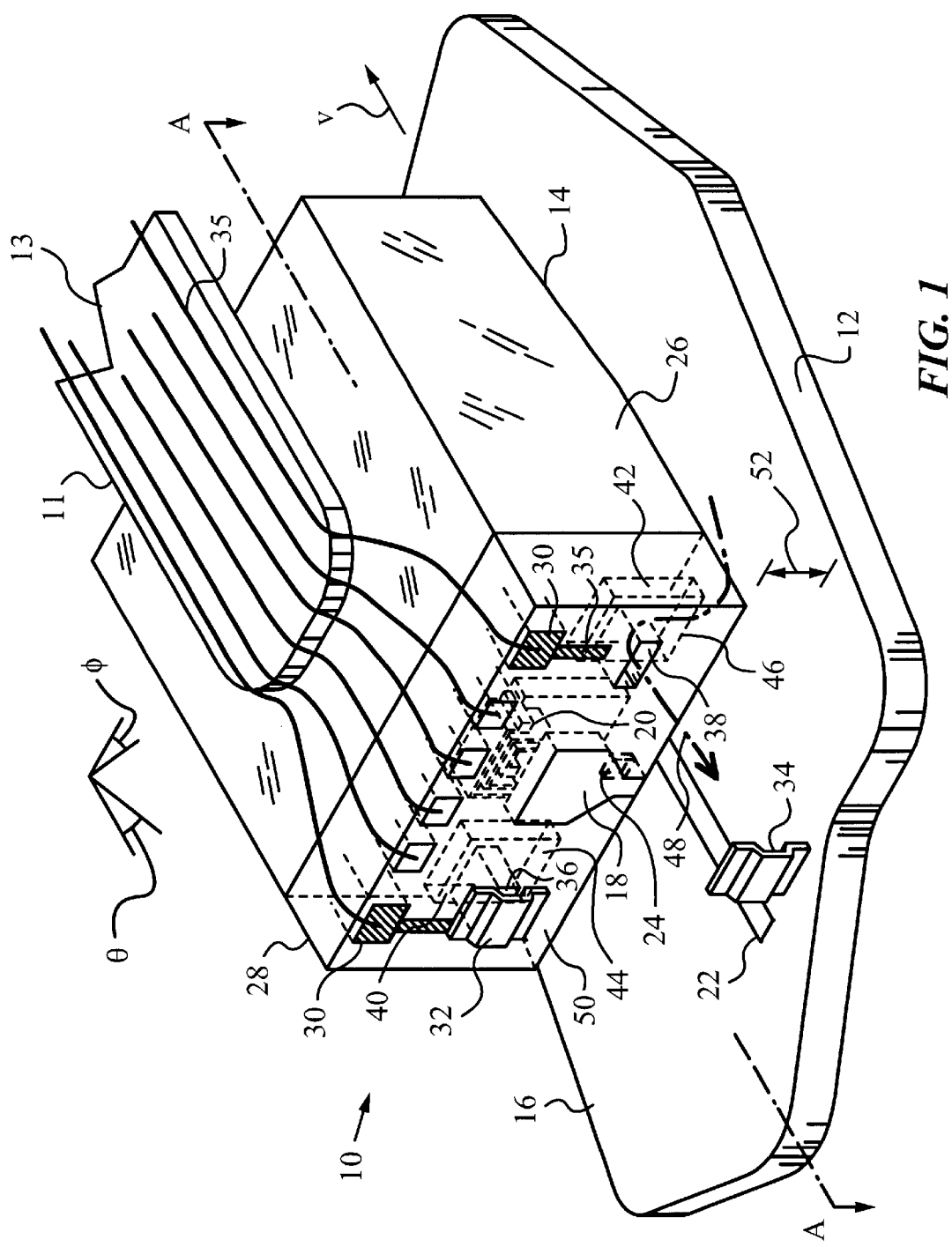
FIG. 1 is an isometric view of an air bearing slider in accordance with the invention.

An air bearing slider 10 in accordance with the invention is shown in FIG. 1. Slider 10 is mounted at the end of an actuator arm 13, or, more precisely, on suspension 11 terminating arm 13. Slider 10 is positioned above a recording medium 12, in this case a magnetic disk, such that an air bearing surface 14 of slider 10 faces a disk surface 16. Slider 10 has a magnetic recording or write head 18 with a coil 20 for recording data on a track 22 of disk 12. The reading of data is accomplished by a read head 24, e.g., a magnetoresistive (MR) head, a giant magnetoresistive (GMR) head, a tunnel sensing head or any other suitable reading head integrated with the recording head 18, as is known in the art.

Slider 10 has a body 26 which is attached to suspension 11 on arm 13, and a back portion 28 which contains head 18. In fact, body 26 is preferably a substrate (e.g., a ceramic substrate) on which back portion 28 is fabricated.

A number of studs or bonding pads 30 are patterned in back portion 28. Studs 30 are provided for making the necessary electrical connections to write head 18 and to read head 24 as well as any other components, e.g., sensors (not shown) mounted on slider 10. Additionally, pins 30 are also used for making electrical connections to valves 32, 34 mounted on a back surface 50 of back portion 28 of slider 10. Slider 10 is constructed in such a way that back surface 50 is nearly perpendicular to or exactly perpendicular air bearing surface 14 at back portion 28.

Valves 32, 34 can be electrostatic valves, piezoelectric valves, electrothermomechanical valves, electromagnetic valves or hydraulic valves. In the last case, an electrically or optically activated hydraulic system, e.g., a fluistor system, can be used. Such systems are well-known in the art. In fact, any of the above valve types and their operating parameters are well-known to a person of average skill in the art.

Valves 32, 34 are mounted over outlets 36, 38 of ducts 40, 42 to control the passage of air through outlets 36, 38. Ducts 40, 42 have inlets 44, 46 at air bearing surface 14 of slider 10. As disk 12 rotates slider 10 flies above it at a relative velocity v and air enters ducts 40, 42 through inlets 44, 46. For demonstration purposes, valve 34 is drawn removed from slider 10 such that an air flow 48 passing through duct 42 can be clearly shown. In particular, when valve 34 is open, air flow 48 enters duct 42 through inlet 46 and passes out through outlet 38.

The writing of data in track 22 is a near-field process requiring head tip 24 to be in close proximity to track 22. Thus, head tip 24 is located at a flying height 52 above track 22 as slider 10 flies above disk 12.

Figure 2:
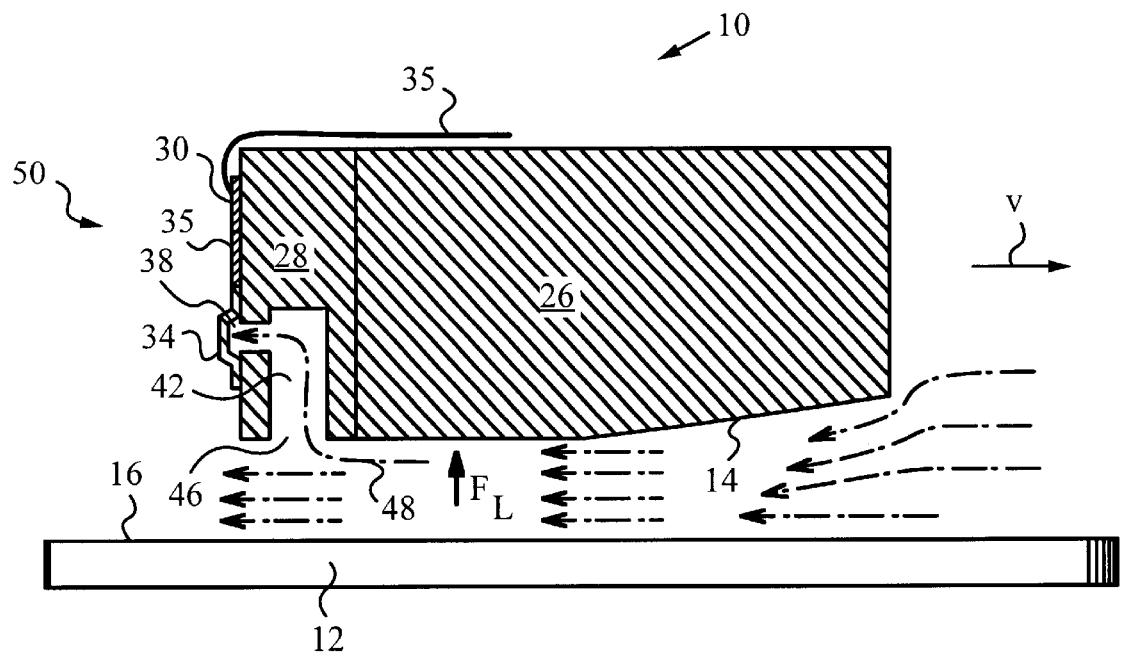
FIG. 2 is a cross sectional view along line A-A of the slider of FIG. 1.

In accordance with the invention, ducts 40, 42 in conjunction with valves 32, 34 are used to adjust and maintain flying height 52 as required for the writing and reading of data. This process will be better understood by referring now to FIG. 2 which shows a cross sectional view of slider 10 along line A—A through duct 42 controlled by valve 34.

As slider 10 flies over disk surface 16 at relative velocity v, air is pushed under air bearing surface 14 and is compressed as indicated by the air current arrows. In fact, the arrows indicate a layer of air which is compressed between air bearing surface 14 and disk surface 16. The pressure of the layer of air increases over air bearing surface 14 and generates a lift force $F_L$ acting on slider 10 to support it at flying height 52. The actual lift force $F_L$ depends on the exact shape or pattern of air bearing surface 14. Using specific geometrical features on an air bearing surface to locally alter lift force $F_L$ is well-known in the art.

Duct 42 modifies the effective pattern of air bearing surface 14 by altering the allowable air current paths which determine the local pressure beneath slider 10. In particular, when valve 34 is open a portion of the air current designated as air flow 48 enters duct 42 through inlet 46 and exits through outlet 38 at back side 50 of slider 10. This changes the pressure beneath slider 10 in the region of air bearing surface 14 adjacent inlet 46. As a consequence, lift force $F_L$ near inlet 46 decreases. In order for this process to be efficient, it is preferable that the cross section of duct 42 be sufficiently large to not offer resistance to air flow 48.

When valve 34 is closed there is no air flow 48 through duct 42. Hence, the effective pattern of air bearing surface 14 is not altered and neither is lift force $F_L$ near inlet 46. Of course, the opening and closing of valve 34 can also be adjusted step-wise or even continuously to vary the magnitude of air flow 48 and thus achieve precise control of lift force $F_L$ acting on slider 10 near inlet 46.

In the present embodiment valve 34 is an electrostatic valve and is connected by an electrical connection 35 to stud 30, and from stud 30 to a control unit 54. Electrical connection 35 can include, e.g., a wire lead, which runs to control unit 54 (see FIG. 3). It is well-known how to make such a connection from stud 30 along arm 11 to any control device or mechanism such as unit 54. The state of valve 34 is governed by the voltage applied to it by unit 54 via lead 37.

When operating slider 10 both valve 32 and valve 34 are adjusted to alter the lift forces $F_L$ near inlets 44 and 46, respectively. For this purpose, control unit 54 is connected to both valves 32, 34. The connection to valve 32 is made in the same manner as the connection between valve 34 and control unit 54.

Figure 3:
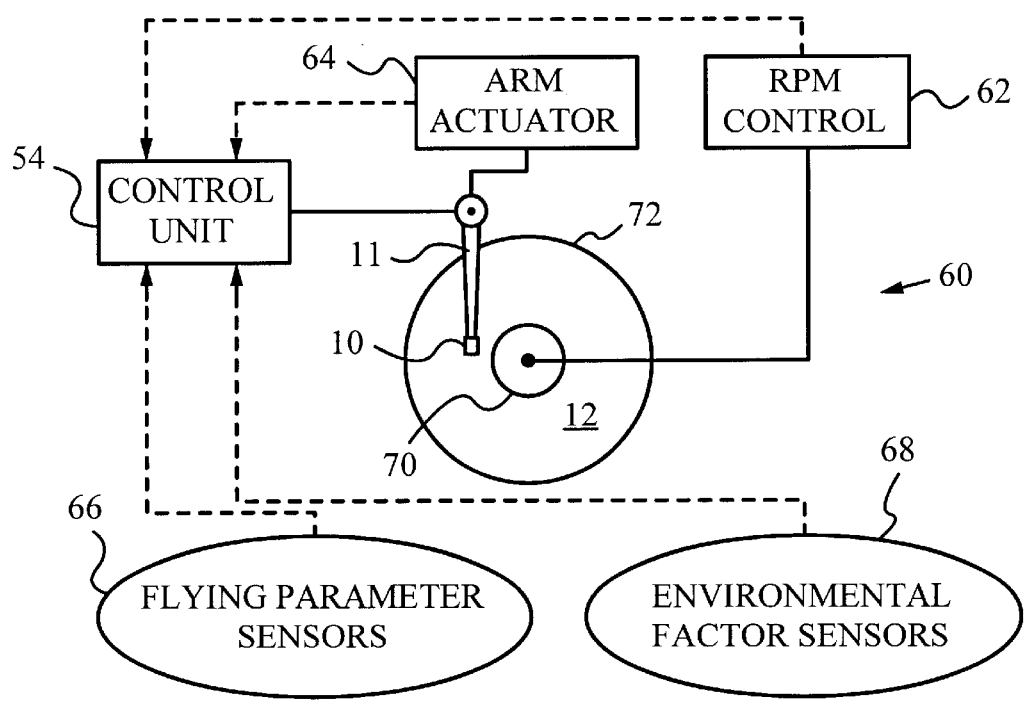
FIG. 3 is a schematic block diagram showing the information used to control the valves of the air bearing slider of FIG. 1.

The schematic block diagram in FIG. 3 illustrates the function of control unit 54 in a disk drive 60 utilizing slider 10. Control unit 54 is connected to both valve 34 and valve 32. The air flows through ducts 40, 42 can be adjusted by control unit 54 together or independently.

Although in most cases valves 32, 34 are opened and closed together, valves 32, 34 can also be opened and closed independently. In these situations, lift force $F_L$ next to inlet 44 may be decreased by opening valve 32 while lift force $F_L$ next to inlet 46 may remain unadjusted by keeping valve 34 closed. For example, such independent control can be used to adjust for slider roll. Proper design, however, is normally sufficient to prevent roll variation thus eliminating the need for such compensation.

The state of valves 32, 34 is controlled by unit 54 to compensate for any parameters which affect the flying height. These parameters include flying parameters, environmental factors and/or manufacturing tolerances of disk drive 60. Unit 54 compensates for any or all of these parameters by controlling the state of valves 32, 34 such that a desired flying height 52 is achieved and maintained. For example, when head 18 is not being used an idle flying height 52 of 5–50 nm or more is desired. For near-contact or contact recording and reading of data flying height 52 should be kept between 0–15 nm.

Preferably a two-state, open valve and closed valve approach is utilized. In other words, valves 32, 34 are either both open or closed by unit 54. In the open state flying height 52 is preferably in the 0 nm to 15 nm range. Specifically, flying height 52 of slider 10 with both valves open is set for near-field or contact recording and/or reading. In the closed state flying height 52 is preferably in the 5 nm to 50 nm range. Usually, this range is reserved for times when no reading or writing takes place.

To simplify the control of valves 32, 34 it is also preferable that an open-loop control scheme be utilized. In other words, unit 54 does not require any feedback information about the instantaneous flying height 52 or any other operating parameters of slider 10. Valves 32, 34 are opened for writing or reading and closed otherwise.

In a preferred implementation of two-state and open-loop control flying height ranges with valves 32, 34 open and closed are pre-set based on the design of slider 10. For this purpose, the aerodynamic properties such as the shape of air bearing surface 14 and the weight of slider 10 are predetermined by the designer in accordance with well-known principles.

Alternatively, the open valve and closed valve flying height ranges can be used to compensate for change in flying height 52 due to changes in relative velocity v at high and low rpms of disk 12. In this case, unit 54 is in communication with an rpm control 62. Control 62 operates disk 12 at high rpms for rapid data access when sufficient drive power is available and at low rpms when operating on limited power (e.g., battery supply).

A change in rpm directly affects relative flying velocity v. When the difference between the high and low rpm is a factor of 2, the overall variation in flying velocity v from inner diameter 70 of disk 12 at the low rpm to outer diameter 72 of disk 12 at the high rpm is a factor of around 4. When control 62 informs unit 54 that disk 12 is operating at high rpms unit 54 keeps valves 32, 34 open to keep flying height 52 ranging from, e.g., 5 nm to 50 nm. At low rpms unit 54 closes valves 32, 34 to maintain flying height 52 between 5 nm and 50 nm as well. Thus, the opening and closing of valves 32, 34 yields at least two different states, each of which can be tailored in fly height 52 to either high or low rpm operation to preserve uniform or nearly uniform fly height 52 over the full range of relative velocity v.

Opening and closing of valves 32, 34 can also be used to compensate for flying height changes due to changes in ambient pressure. For this purpose, unit 54 is in communication with environmental factor sensors 68 including, in particular, a pressure meter. The pressure meter informs control unit 54 when disk drive 60 is operating in a low pressure environment, e.g., on board an airplane flying at a high altitude. In this situation unit 54 closes valves 32, 34 to maintain flying height 52 in the range, e.g., between 5 nm and 50 nm. At atmospheric pressure, unit 54 opens valves 32, 34 to maintain flying height 52 at 5 nm to 50 nm as well.

There are also various closed-loop adjustment schemes which unit 54 can utilize to maintain a desired flying height 52. Unit 54 can use data from various sources to determine and adjust flying height 52. Advantageously, unit 54 is connected to rpm control 62, an arm actuator 64, flying parameter sensors 66 and environmental factor sensors 68. Environmental factors sensors 68 typically include sensors measuring pressure and temperature.

Depending on the design parameters of drive 60 and the application, different selections of flying parameter sensors 66 and environmental factor sensors 68 are used. Sensors capable of sensing flying parameters and environmental factors as well as their operating characteristics are well-known in the art and will not be described.

In one embodiment adjustment of flying height 52 by unit 54 is performed with the aid of only a flying height sensor which belongs to flying parameter sensors 66. Flying height sensor measures flying height 52 and sends the measured value to unit 54. Alternatively, control unit 54 can obtain the value of flying height 52 directly from head 18. A standard feedback circuit is employed by unit 54 to compare measured value of flying height 52 obtained from the flying height sensor (or from head 18) with the desired value of flying height 52 and open or close valves 32, 34 as necessary.

Figure 4:
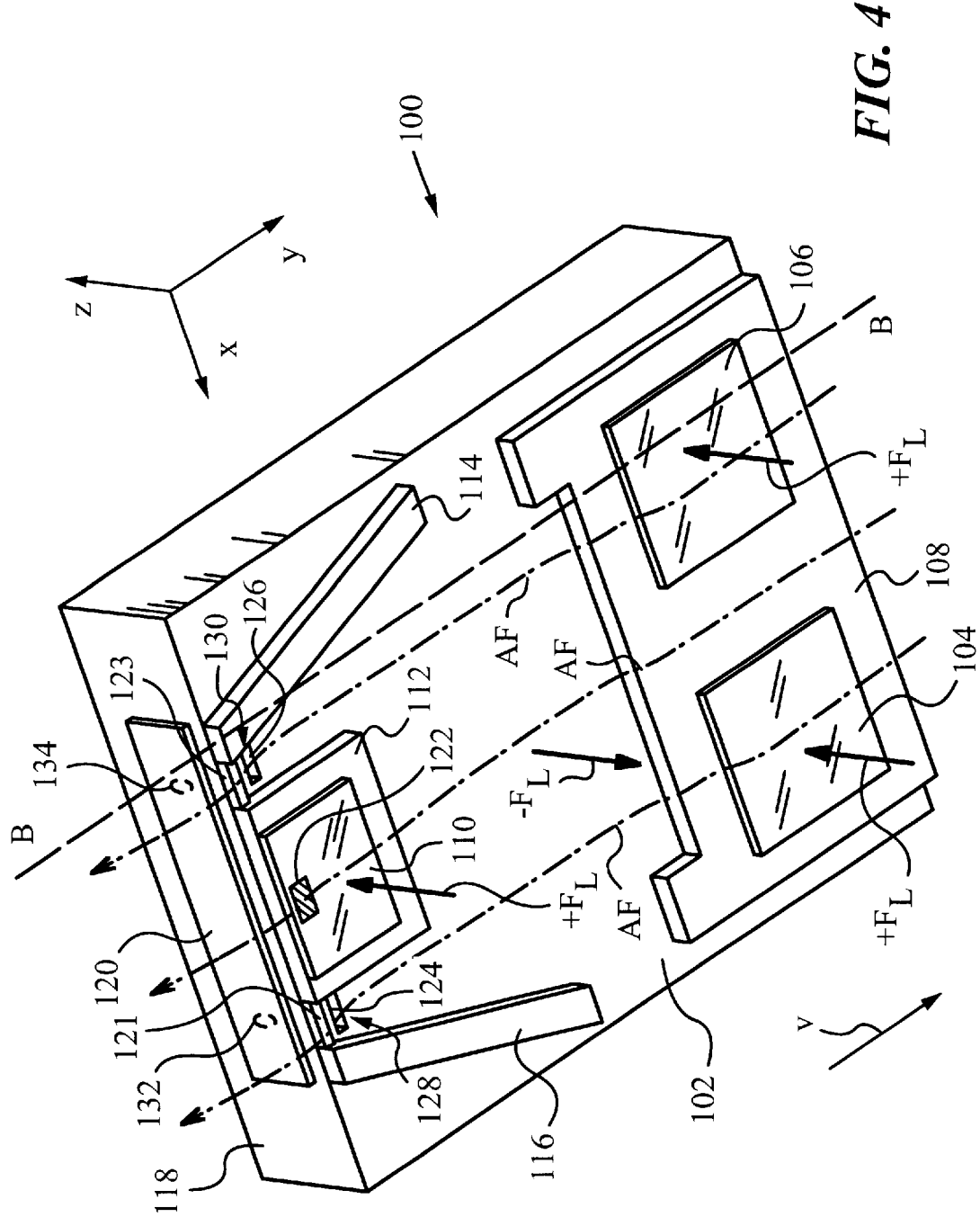
FIG. 4 is bottom isometric view of a preferred air bearing slider with ducts.

A preferred slider 100 is shown in FIG. 4 and in the cross sectional views of FIGS. 5A–B. Slider 100 has an air bearing surface 102 with several surface features for altering the air current and hence the lift force $F_L$ acting on different portions of air bearing surface 102. In particular, slider 100 has two pads 104, 106 located on a larger pad 108 in the front portion of air bearing surface 102. A pad 110 is located on a pad 112 in the back portion of air bearing surface 102. A head tip 122 of an integrated magnetic write and read head is located at the back edge of pad 112.

Two side rails 114, 116 flank pads 110, 112. In general, pads 104, 106, 108, 110, 112 and side rails 114, 116 may have more complicated shapes, depending on the desired pressure distribution under surface 102 while slider 100 is flying. More particularly, since the pressure distribution determines lift force $F_L$ over surface 102, the pattern of the pads is designed to achieve a particular distribution of lift force $F_L$ over surface 102 while slider 100 is flying. Typical heights of the pads can range between 0.1 to 10 μm or less.

The dashed and dotted arrows AF indicate the flow of air over surface 102 while slider 100 is flying at velocity v relative to the disk. The solid arrows indicate regions in which the pad pattern generates a positive lift force $+F_L$ and a negative lift force $-F_L$ on slider 100.

A back surface 118 of slider 100 is flat and perpendicular to air bearing surface 102. Two inlets 124, 126 to corresponding ducts 128, 130 are located on either side of pad 112 near back surface 118. Side rails 114 and 116 are positioned in such a way that they funnel the air flow to inlets 124, 126. In addition, two fence portions 121, 123 are located downstream from inlets 124, 126. Fence portions 121, 123 can be replaced by a single fence element 125 at the edge of air bearing surface 102 and back surface 118 as shown in FIG. 6. It is important, however, that fence portions 121, 123 or single fence 125 be located directly in the air flow downstream from inlets 124, 126.

A single flap valve 120 is mounted on back surface 118. Flap valve 120 covers outlets 132, 134 of ducts 128, 130. It is preferable that flap valve 120 be of the type requiring only one electrical connection for operation. The ground connection can be connected to the body of slider 100 or to a grounded portion of head 142. In this manner the need for an extra electrical connection (wire) is circumvented.

In fact, preferred flap valve 120 is a ribbon-like plated metal strip about 5 $\mu$m thick traversing the width of slider 100 at several tens of $\mu$m away from air bearing surface 102. Flap 120 is anchored at both ends. During processing a release layer is removed between flap 120 and an underlying insulating layer (not shown). To facilitate this release, etching holes may be provided in flap 120 away from outlets 132, 134.

The cross sectional views of FIGS. 5A and 5B along line B—B illustrate the effects of flap valve 120 being open and closed. In particular, when valve 120 is closed no air passes through duct 130. Hence, there is a positive lift force $+F_L$ acting on slider 100 at back surface 118. Since fence portion 123 is positioned in the air flow it acts as a surface feature compressing the air flow at back surface 118. Hence, there is a further increase in positive lift force $+F_L$ on slider 100. The positive lift force $+F_L$ raises the back portion of slider 100 and increases flying height 140 of head 142. It can also help to reduce pitch θ between slider 100 and a disk surface 138 if desired.

In the open position flap valve 120 allows an air flow 144 to pass through duct 130. Side rail 114 aids in funneling the air flow to inlet 126. This decreases the pressure at back surface 118 and causes positive lift force $+F_L$ to decrease significantly, or even causes a negative lift force $-F_L$ to be applied on slider 100 at back surface 118. The decrease in lift force can be used to increase pitch θ if desired.

Since flap valve 120 covers both outlets 132, 134 the same conditions apply to duct 128. Side rails 114, 116 aid in funneling the air flow to ducts 128, 130. Fence portions 121, 123 promote increased air flow through both ducts 128, 130 when valve 120 is open.

Figure 7A:
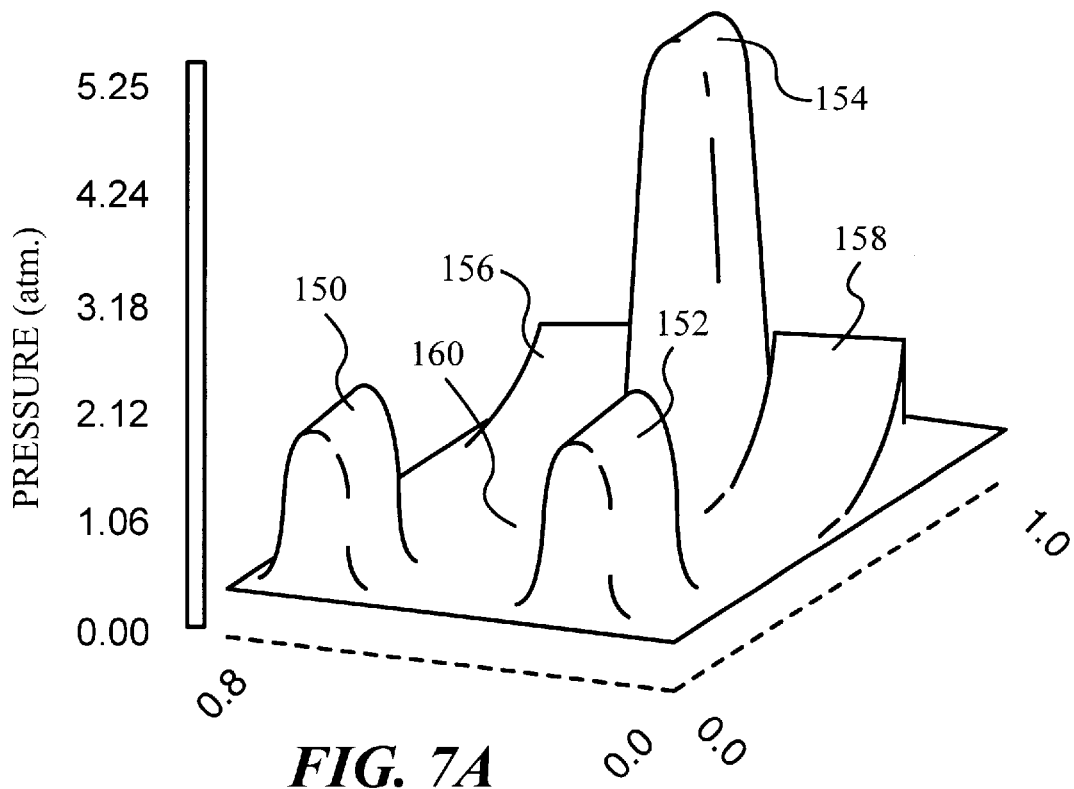
FIG. 7A is a graph illustrating the pressure profile under the air bearing surface of the slider of FIG. 4 when the flap valve is closed.

FIG. 7A shows a pressure profile produced by the air flow on air bearing surface 102 when flap valve 120 is closed. In this example the area of air bearing surface 102 is 0.8 mm by 1 mm. High pressure regions 150, 152 and 154 correspond to the locations of pads 104, 106 and 110. Those are the regions where positive lift force $+F_L$ acts on surface 102 because of the large above ambient pressure. There are also high pressure regions 156, 158 corresponding to the regions on either side of pad 110, i.e., between pad 110 and side rail 116 and between pad 110 and side rail 114. It is clear from the pressure profile how side rails 116 and 114 serve as flow guides and funnel the air flow toward inlets 124, 126. This helps to achieve a higher pressure at the back of slider 100. A middle region 160 between the peaks exhibits sub-ambient pressure. That is where negative lift force $-F_L$ acts on slider 100. Flying height 140 when valve 120 is closed is 17 nm.

Figure 7B:
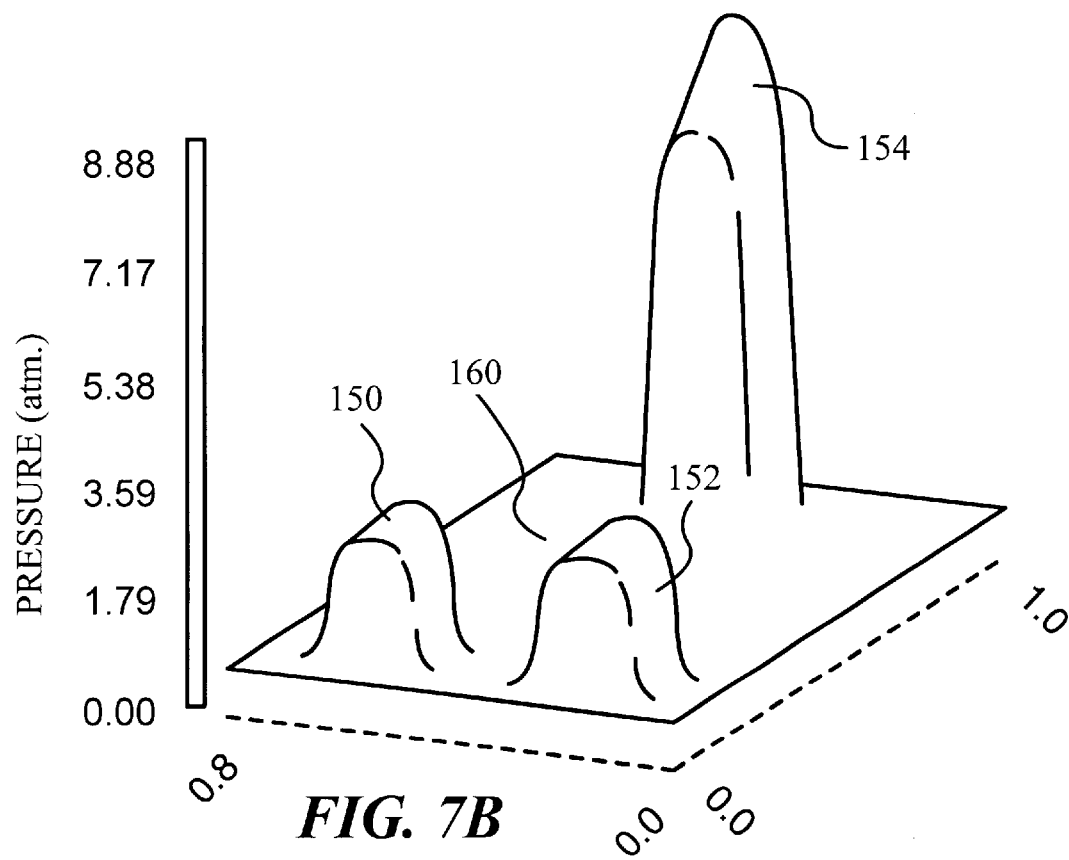
FIG. 7B is a graph illustrating the pressure profile under the air bearing surface of the slider of FIG. 4 when the flap valve is open.

FIG. 7B shows a pressure profile on surface 102 when flap valve 120 is open. Since ducts 128 and 130 now conduct air, pressure regions 156, 158 are flattened out and the magnitudes of pressure peaks 150, 152 and 154 change. Region 160 of sub-ambient pressure expands to surround peak 154. Thus, negative lift force $-F_L$ acts on slider 100 on either side of pad 110. Flying height 150 with valve 120 open is 9 nm.

Slider 100 can be further modified in many ways. For example, the widths of inlets 124, 126 to ducts 128, 130 can be altered to reduce or increase the magnitude of the adjustment.

Figure 8:
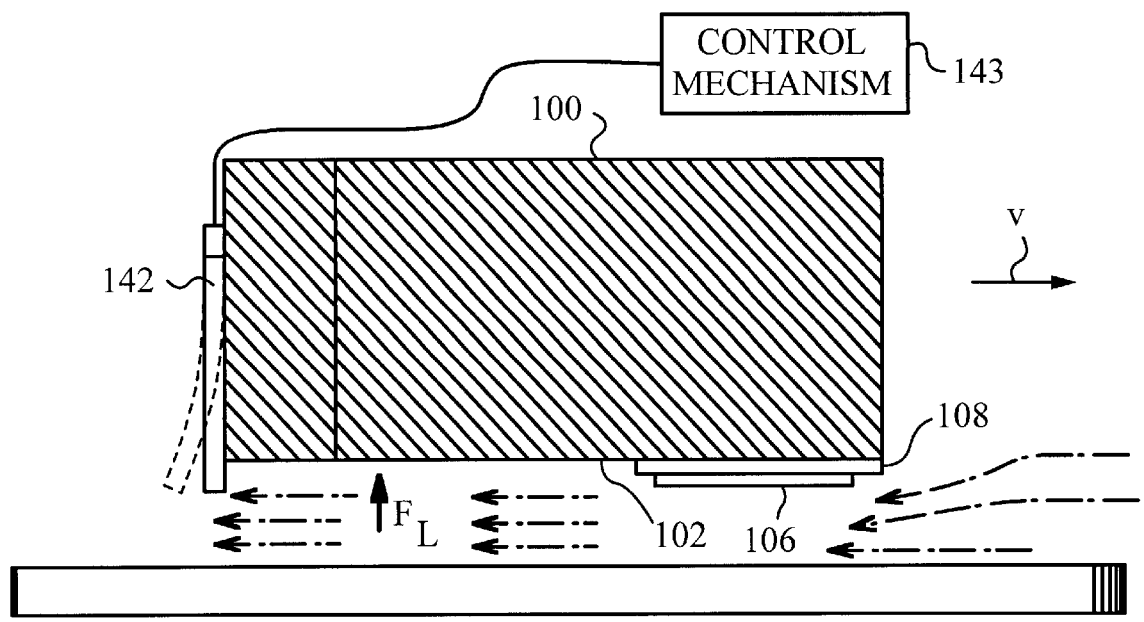
FIG. 8 is a cross sectional side view of an air bearing slider with a deformable surface feature on the back side.

FIG. 8 illustrates in a cross sectional view slider 100 modified to operate without ducts. In this ductless embodiment a deformable surface feature in the form of a flap 142, which can be analogous to flap valve 120, extends past air bearing surface 102. In fact, an edge portion of flap 142 extends into the air flow exiting from under air bearing surface 102. Thus, in the activated or closed position the edge portion of flap 142 has an analogous effect on the air flow as fence 123.

Slider 100 has a control mechanism 143 for activating and deactivating flap 142. When flap 142 is deactivated or opened it ceases to buffet the air flow and facilitates its flow. This reduced lift force $F_L$ at the back of slider 100. Thus, the effect is analogous to opening the valves in the duct-based adjustment mechanism described above.

Figure 9:
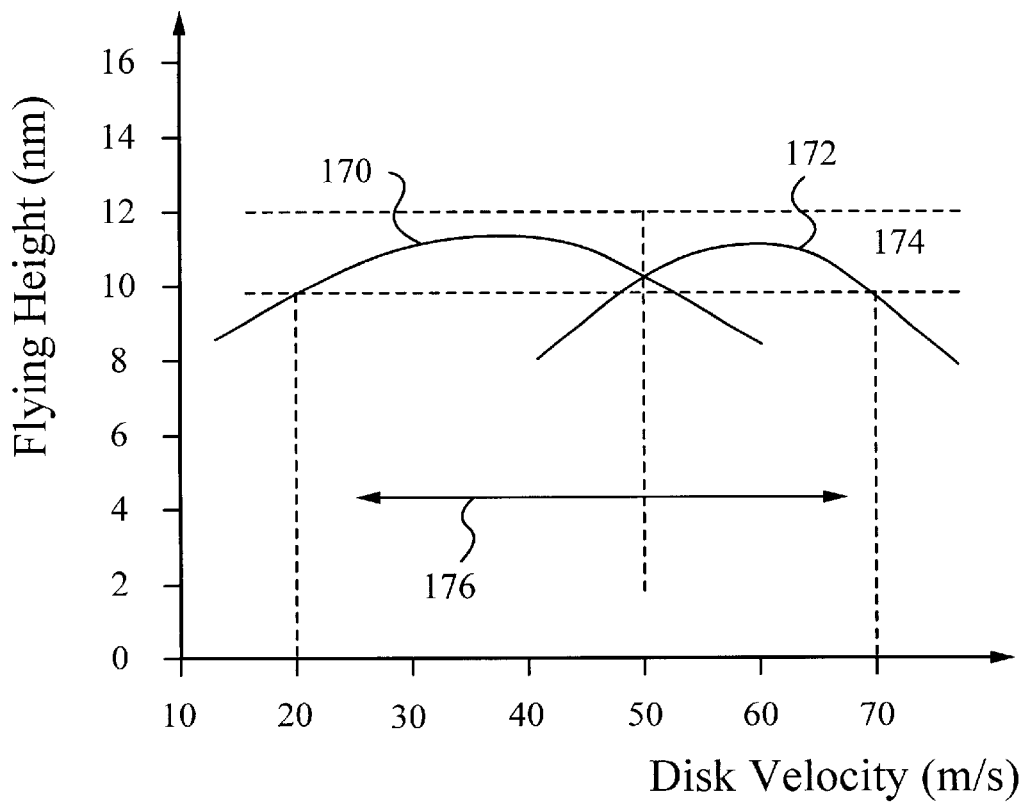
FIG. 9 is a graph illustrating the flying height as a function of disk velocity and valve state.

FIG. 9 illustrates on the example of slider 100 how any slider equipped with a duct-based or ductless flying height adjustment mechanism of the invention can be used to minimize flying height variation or maintain a pre-set flying height over a wide range of flying velocities v. Graph 170 represents flying height as a function of flying velocity v with flap valve 120 open. Graph 172 represents flying height as a function of flying velocity v with flap valve 120 closed. Dashed tolerance range 174 indicates an acceptable variation or tolerance in flying height over flying velocity v range 176 from 20 to 70 m/s. The actual tolerance may vary depending on whether near-contact or contract recording is used. In the case of near-contact recording tolerance range 174 may be maintained on the order of 2 nm.

To maintain flying height within tolerance range 174 flap 120 is kept closed until reaching a flying velocity v around 50 m/s. For flying velocities v above 50 m/s flap 120 is opened to thus reduce flying height. In this way flying height is maintained within tolerance 174 at all times. A person of average skill in the art will recognize that these numbers are for illustration purposes only. Furthermore, partial opening of valve 120 can permit to further minimize tolerance range 174.

FIGS. 10A and 10B illustrate alternative valves which can be used for regulating air flow through the duct or ducts in an air bearing slider according to the invention. In FIG. 10A a diaphragm valve 180 is used to open and close an outlet 182 of a duct 184 in an air bearing slider 186. In order to achieve compression of air flow a back portion 188 of air bearing surface 190 of slider 186 is raised to form a fence.

Diaphragm valve 180 has a membrane layer 192, an air gap 196, and an electrode layer 198. The opening and closing of valve 180 is controlled by a voltage applied between membrane layer 192 and electrode 198. A thin insulating layer 199 which is pin-hole free is positioned between membrane layer 192 and electrode 198. For efficiency reasons layer 199 is preferably thin such that the electrostatic force acting on valve 180 is maximized. Layer 199 also preferably has a high dielectric constant to increase the amount of force which holds membrane layer 192 against slider 186 Preferably, the material of layer 199 also has a high break-down voltage, so that a large voltage can be applied across it. Suitable materials include $Ta_2O_5$, $Nb_2O_5$, $WO_3$ and other dielectrics known in the art. The manner of operating valve 180 is known.

In FIG. 10B a cantilever valve 200 is used to open and close an outlet 202 of a duct 204 in an air bearing slider 206. Cantilever valve 200 has a top layer 208, an air gap 212 and an electrode layer 214. Once again, the opening and closing of valve 200 is controlled by a voltage applied between top layer 208 and electrode 214, as is known in the art. A thin insulating layer 215 between the electrodes is also provided in this case.

A person of average skill in the art will recognize that any air bearing slider can be adapted to employ the duct-based or ductless flying height adjustment mechanism of the invention. It should be noted, that a duct-based adjustment mechanism allows the valve to be placed away from the air bearing surface. In some embodiments, a duct or several ducts from the air bearing surface to the back surface of a slider can be controlled by a valve or valves to adjust the flying height and, if desired pitch θ. Sliders, such as pad sliders for near-contact or even sliders for contact recording can advantageously use the mechanism of the invention.

FIG. 11A illustrates how the mechanism of the invention is adapted in a dual rail slider 300. An inlet 302 to a duct 304 is located in the back portion of an air bearing surface 306. A fence 308 is located past inlet 302 to further increase the air pressure at the back of surface 306. Two integrated read/write heads 310, 312 are mounted inside rails 314, 316. The air flow exiting through an outlet 319 of duct 304 when a valve (not shown) on a side surface 318 of slider 300 is open is indicated by the dashed and dotted arrow. Alternatively, outlet 319 can be provided on the side of slider 300 and be controlled by a separate valve. The valves can be operated separately or together such that air flows from air bearing surface 306 to both or just one side of slider 300.

In FIG. 11B the mechanism of the invention is implemented in a tri-rail slider 320. In this case a single read/write head 324 is mounted in a center rail 322. There are two ducts 326 and 328 on either side of center rail 322 near back surface 330. Outlets 332, 334 as well as their inlets 336, 338 are shown. Two fence portions 337, 339 are provided downstream from inlets 336, 338. The air flow when the valves (or a single valve) on the back surface is open is indicated by the dashed and dotted arrows.

Figure 11C:
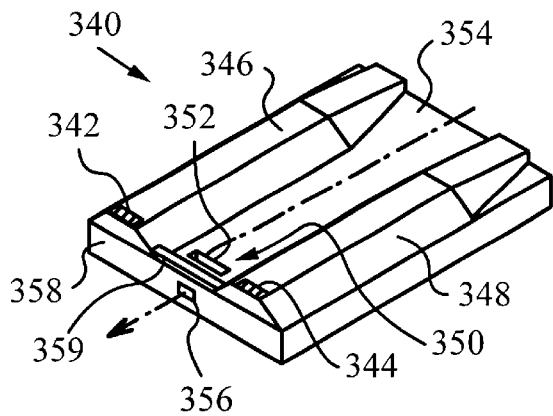

A transverse pressure contour or profile slider 340 fitted with the mechanism of the invention is shown in FIG. 11C. Slider 340 has two heads 342, 344 in the back portions of rails 346, 348. A single duct 350 has an inlet 352 at an air bearing surface 354 and an outlet 356 at a back surface 358. A fence 359 is located downstream from inlet 352. A dashed and dotted arrow indicates the air flow when the valve (not shown) is open.

Figure 11D:
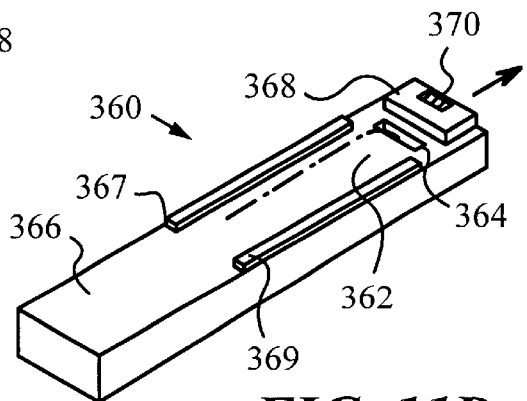

In FIG. 11D an integrated slider 360 specially adapted for contact recording is equipped with a duct 362. Duct 362 has an inlet 364 at an air bearing surface 366 and an outlet on a back surface (not visible in this drawing). A pad 368 acts as a fence element in this case and aids in compressing the air in the back portion of surface 366. A head 370 is mounted in pad 368. Two side rails 367 and 369 help to funnel the air flow to inlet 364. The air flow when duct 362 is open is indicated with a dashed and dotted arrow.

There are various modifications which can be made to the valves used in the mechanism of the invention. For example, in slider 100 shown in FIG. 4 flap valve 120 can be made up of two separate flap valves, one for each outlet 132, 134. The two flaps can be connected by a compliant spring to allow easier actuation. Flap 120 or the two flaps can be anchored to back surface 118 by their top portions only.

Also, the valves can be processed under compression, thereby causing some buckling contact to the insulating layer. This is best explained by referring back to valve 180 shown in FIG. 10A. In this case, buckling of membrane 192 towards insulating layer 199 reduces the actuation force and voltage needed to operate valve 180. Proper buckling is ensured during the release step of membrane 180, i.e., when forming air gap 196 (also see FIGS. 16A–B). Preferably, after release membrane 192 is under compression and will thus have a preference to buckle down toward insulating layer 199 or electrode 198. This may be encouraged even further by introducing a stress gradient through the thickness of the membrane material.

FIG. 12A illustrates a back surface 380 of a slider 381 designed for step-wise flying height adjustment. Six outlets 382A–F of corresponding ducts (not indicated) are arranged in two groups of three symmetrically about the center of back surface 380. These ducts are connected to inlets at the air bearing surface located at different positions on the air bearing surface. Furthermore, outlets 382A–F are subdivided into symmetric pairs 382A, 382F; 382B, 382E and 382C, 382D such that each pair has a connection to a duct leading to equivalent duct openings on the air bearing surface.

Each of outlets 382A–F is equipped with a valve 383A–F. In this case valves 383A–F flap valves of varying lengths. Specifically, valves 383A–F are subdivided into pairs 383A, 383F; 383B, 383E and 383C, 383D of equal lengths. Interconnected leads 384A–F are provided for electrically connecting a control unit 385 to valves 383A–F.

Control unit 385 applies a variable voltage to valves 383A–F to regulate flying height in three steps. As the applied voltage changes valves 383A–F close pair-wise. That is because the lengths of flap valves 383A–F determine their stiffness and hence the closing force. Consequently, valve pair 383C, 383D closes outlet pair 382C, 382D at a low voltage. Valve pair 383B, 383E closes outlet pair 382B, 382E at an intermediate voltage. Finally, valve pair 383A, 383F closes outlet pair 382A, 382F at a high voltage. As each valve pair closes, the flying height changes in step-wise fashion, since air flow through the corresponding duct pair is cut off.

The three voltage levels at which the successive pairs of valves close will depend on the actual valves. Preferably, the voltages remain in the range of several Volts.

Alternatively, each of valves 383A–F can be provided with its own lead to control unit 385. In this case all valves can have the same length and the same voltage level can be used to close any of them. It is also possible to use a larger number of ducts and thus increase the number of adjustment steps and provide for quasi-continuous flying height adjustment.

FIG. 12B shows a back surface 390 of a slider 391 equipped with a single flap valve 392. Valve 392 covers six outlets 393A–F of corresponding ducts (not shown) and is anchored to back surface 390 at two opposite sides. A control unit 394 is connected via leads 395A, 395B to two contacts at the opposite sides of valve 392. The application of an increasing voltage to valve 392 by unit 394 results in progressive, pair-wise closing of valves 393C, 393D then 393B, 393E and finally 393A, 393F. This approach affords a stepwise flying height adjustment.

The above embodiments indicate how the mechanism of the invention can be adapted to any type of slider. Based on those embodiments, a person of average skill in the art will be able to find the optimal configuration for any given slider, number of ducts, types of valves and other case-specific parameters.

There is a preferred method of making sliders with the flying height adjustment mechanism of the invention. In particular, it is preferred to fabricate the duct or ducts and the magnetic recording head concurrently. In fact, it is preferred to fabricate the duct or ducts and the magnetic head using the same processing steps.

A preferred manufacturing process of ducts in air bearing sliders in accordance with the invention employs photolithographical deposition and etching steps and is compatible with batch processing. Of course, it is also possible to apply any part of the duct and valve structure as a separate part to the rest of the slider structure. For example, in the preferred slider 100 flap valve 120 can be mounted separately in the form of a detachable, ribbon-shaped part. In this case it should be bonded in place to the electrical/mechanical support points on back surface 118, such that valve 120 can be forced against back surface 118 of slider 100 to close ducts 128 and 130. This approach is advantageous because it simplifies manufacturing by overcoming etch release problems associated with finishing flap valve 120. In mass production, flap 120 can be transferred singly or as a group, as a wafer process or a row process or as an individual slider process. This approach also affords the manufacturer greater latitude in the choice of material for flap valve 120. However, it maintains the advantageous processing approach in which the ducts are created using head manufacturing steps, as described below.

In accordance with a preferred manufacturing process the duct or ducts are created in undercoat/overcoat alumina layers to enable the directing of air flow from the air bearing surface of the slider to the top or sides of the slider. This is accomplished by using channel sacrificial material during the fabrication sequence of the thin film head and then dissolving this material after wafer processing is completed and after the slider lapping process is completed. This can be seen, e.g., in slider 10 where back portion 28 contains the head structure embedded in the undercoat and overcoat alumina layers on top of substrate constituting body 26 of slider 10. Air bearing surface 14 is formed by a lapping and patterning process.

FIGS. 13A–H illustrate the preferred manufacturing process of an exemplary duct. It is understood that materials can be substituted and other modifications to this process can be made by a person skilled in the art. It should also be noted that this process can be adapted to any suitable slider geometry by a person of average skill in the art.

First, an alumina undercoat layer 400 is deposited on a wafer 402. Note that wafer 402 forms the body or at least a portion of the body of the finished slider. Then, a first duct sacrificial layer 404 of Cu is plated on layer 400 in the form of a first portion of a desired duct. Next, an alumina overcoat 406 is deposited followed by planarization.

In the next step a second duct sacrificial layer 408 of Cu is formed on first duct sacrificial layer 404. Together, the shapes of layers 408 and 404 define the geometry of a desired duct. Now a layer of alumina 410 is coated over sacrificial layers 404, 408 and planarized.

After completion of the above steps the wafer is sawed into rows and lapped to create the air bearing surface (ABS). (In this case a number of sliders are created at the same time.) Finally, sacrificial layers 404, 408 are dissolved with a copper etchant. When layers 404, 408 are removed a duct 412 is formed between the air bearing surface and the orthogonal surface, e.g., a back surface or a side surface of the finished slider.

Most preferably, the process for forming the duct is integrated with the processing steps which form the head structure. Specifically, first duct sacrificial layer 404 can be formed when the Cu coil structure of the head is being fabricated. Second duct sacrificial layer 408 can be formed when the Cu studs of the head are fabricated. The final planarization of these studs will also planarize second duct sacrificial layer 408.

FIGS. 14A–D illustrate an integrated process for producing a head and two ducts 412 concurrently. First, a bottom yoke 414 is deposited on alumina undercoat layer 400. Next, first duct sacrificial layers 404 are plated and at the same time coil 416 is also plated. Then, a top yoke 418 is deposited. Now, top yoke 418 is finished and second duct sacrificial layers 408 are plated. At the same time, studs 420 are formed. Finally, ducts 412 are opened in a finishing step with an etchant, as explained above.

In yet another processing method first duct sacrificial layer 404 can be formed directly into substrate 402. This process is illustrated in FIGS. 15A–E. First, the shape of layer 404 is patterned into substrate 402 to form a region 403. This can be done by ion milling, reactive ion etching (RIE) or machining. Next, undercoat alumina layer 400 is deposited on substrate 402, followed by plating first duct sacrificial layer 404. Then, layer 404 is removed with an etchant except from region 403 where desired first portion of duct 412 has been formed. A planarization step is performed to level the surface of layers 400 and 404. Subsequent processing steps are analogous to those described above.

A preferred process of making a diaphragm valve integrated directly onto the top surface of the wafer with duct 412 is illustrated in FIGS. 16A–B. In particular, a valve is made by patterning directly on top of layer 410 and over second duct sacrificial layer 408 before lapping of the ABS surface. The patterning process is well-known and in a first step produces a valve 430 having a dielectric spacer 432, a bottom electrode 434, a release layer 436 and a top electrode 438. In a second step layers 404, 408 and release layer 436 are removed with an etchant to yield finished valve 430 over duct 412. Of course, a person of average skill in the art will appreciate that many other methods of making valves in accordance with the invention can be utilized as well.

It should be noted that the fabrication of any structures, including the valves and any deformable surface features, on the back surface of a slider can be easily performed by using the above-described fabrication methods and other known patterning techniques. Hence, any structures produced on the back surface can be easily fabricated in a batch process. This is advantageous in large-scale manufacturing.

It will be clear to one skilled in the art that the above embodiments may be altered in many ways without departing from the scope of the invention. Accordingly, the scope of the invention should be determined by the following claims and their legal equivalents.

What is claimed is:

1. An air bearing slider for moving relative to a medium surface of a recording medium, said air bearing slider having an air bearing surface facing said medium surface, a back surface substantially perpendicular to said air bearing surface, and a head located at said back surface at a flying height above said medium surface, said air bearing slider further having a flying height adjustment apparatus comprising:

a) at least one duct having an inlet at said air bearing surface and an outlet at said back surface;

b) a valve mechanism mounted over said outlet for controlling an air flow through said at least one duct and thereby adjusting said flying height.

2. The air bearing slider of claim 1, wherein said valve mechanism is selected from among valves consisting of diaphragm valves, flap valves and cantilever valves.

3. The air bearing slider of claim 2 having two ducts wherein said valve mechanism is a flap valve mounted over said outlets of both said ducts.

4. The air bearing slider of claim 1, wherein said valve mechanism is a valve selected from the group consisting of electrostatic valves, piezoelectric valves electrothermomechanical valves, electromagnetic valves and hydraulic valves.

5. The air bearing slider of claim 1, comprising a plurality of ducts and wherein said valve mechanism comprises a plurality of valves mounted over said outlet of each of said ducts.

6. The air bearing slider of claim 1, comprising a plurality of ducts and wherein said valve mechanism comprises one valve mounted over said outlet of each of said ducts.

7. The air bearing slider of claim 6, further comprising a means for opening and closing said one valve such that a predetermined set of said ducts is open and closed.

8. The air bearing slider of claim 1, further comprising at least one surface feature on said air bearing surface for altering said air flow through said at least one duct.

9. The air bearing slider of claim 8, wherein said at least one surface feature is a fence positioned downstream from said inlet.

10. The air bearing slider of claim 8, wherein said at least one surface feature comprises at least two side rails for funneling said air flow to said inlet.

11. The slider of claim 1, wherein said flying height ranges from 5 nm to 50 nm when said valve mechanism blocks said air flow through said at least one duct.

12. The slider of claim 1, wherein said flying height ranges from 0 nm to 15 nm when said valve mechanism permits said air flow through said at least one duct.

13. The air bearing slider of claim 1 selected from the group consisting of dual-rail sliders, tri-rail sliders, transverse pressure contour sliders, pad sliders and integrated sliders.

14. A disk drive utilizing the air bearing slider of claim 1.

15. An air bearing slider for moving relative to a medium surface of a recording medium, said air bearing slider having an air bearing surface facing said medium surface, a back surface substantially perpendicular to said air bearing surface, and a head located at said back surface at a flying height above said medium surface, said air bearing slider further having a flying height adjustment apparatus comprising:
  a) a deformable surface feature positioned on said back surface, said deformable surface feature extending into an air flow exiting at said back surface from under said air bearing surface;
  b) a control mechanism for adjusting said deformable surface feature to control said air flow thereby adjusting said flying height.

16. The air bearing slider of claim 15, wherein said deformable surface feature is a flap valve having a portion extending into said air flow.

17. The air bearing slider of claim 15, further comprising at least one surface feature on said air bearing surface for altering said air flow at said deformable surface.

18. The air bearing slider of claim 17, wherein said at least one surface feature comprises side rails for funneling said air flow.

19. The slider of claim 15, wherein said flying height ranges from 5 nm to 50 nm when said deformable surface blocks said air flow.

20. The slider of claim 15, wherein said flying height ranges from 0 nm to 15 nm when said deformable surface feature permits said air flow.

21. The air bearing slider of claim 15 selected from the group consisting of dual-rail sliders, tri-rail sliders, transverse pressure contour sliders, pad sliders and integrated sliders.

22. A disk drive utilizing the air bearing slider of claim 15.

23. A method for adjusting a flying height of a head above a medium surface, said head being located at a back surface of an air bearing slider, said air bearing slider having an air bearing surface for moving relative to a medium surface at a flying velocity v, said air bearing surface being substantially perpendicular to said back surface, said method comprising the following steps:
  a) providing at least one duct having an inlet at said air bearing surface and an outlet at said back surface;
  b) mounting a valve mechanism over said outlet;
  c) controlling an air flow through said at least one duct by opening and closing said valve mechanism, thereby adjusting said flying height.

24. The method of claim 23, wherein said at least one duct is made concurrently with said head.

25. The method of claim 24, wherein said head and said at least one duct are made by the same processing steps.

26. The method of claim 23, wherein said valve mechanism is opened and closed in accordance with a predetermined sequence.

27. The method of claim 23 used in contact recording and reading, whereby said flying height is maintained at zero for contact recording and reading and said flying height is increased to a predetermined value at other times.

28. The method of claim 23 wherein said air flow is controlled to compensate said flying height for a change in said flying velocity.

29. The method of claim 28 wherein said air bearing slider is employed in a dual-speed disk drive.

30. The method of claim 23 wherein said air flow is controlled to compensate said flying height for a change in ambient pressure.

31. The method of claim 23 wherein said air flow is controlled to compensate said flying height for a change in temperature.

32. The method of claim 23 wherein said air flow is controlled to compensate said flying height for environmental factors.

33. The method of claim 23 wherein said air flow is controlled to compensate said flying height for manufacturing tolerances.

34. A method for adjusting a flying height of a head above a medium surface, said head being located at a back surface of an air bearing slider, said air bearing slider having an air bearing surface for moving relative to a medium surface, said air bearing surface being substantially perpendicular to said back surface, said method comprising the following steps:
  a) providing at least one deformable surface feature on said back surface, said deformable surface feature extending into an air flow exiting at said back surface from under said air bearing surface;
  b) providing a control mechanism for adjusting said deformable surface feature;
  c) controlling said air flow by adjusting said deformable surface feature and thereby adjusting said flying height.

* * * * *